US008126770B2

(12) United States Patent
Lim

(10) Patent No.: US 8,126,770 B2
(45) Date of Patent: Feb. 28, 2012

(54) ADVERTISEMENT SYSTEM USING MASH-UP MAP AND METHOD THEREOF

(75) Inventor: Seung Phill Lim, Gyeonggi-do (KR)

(73) Assignee: NHN Corporation, Seongnam-si (KR)

( * ) Notice: Subject to any disclaimer, the term of this patent is extended or adjusted under 35 U.S.C. 154(b) by 805 days.

(21) Appl. No.: 12/037,221

(22) Filed: Feb. 26, 2008

(65) Prior Publication Data

US 2008/0208690 A1      Aug. 28, 2008

(30) Foreign Application Priority Data

Feb. 27, 2007   (KR) ................. 10-2007-0019690

(51) Int. Cl.
*G06Q 40/00*     (2006.01)
(52) U.S. Cl. ............ 705/14; 705/26; 705/27; 705/16; 705/21
(58) Field of Classification Search ............. 705/14, 705/15–45
See application file for complete search history.

(56) References Cited

U.S. PATENT DOCUMENTS

| 7,945,774 | B2 * | 5/2011 | Ganesan ............... 713/151 |
| 2006/0263037 | A1 * | 11/2006 | Gilley ................. 386/52 |
| 2007/0192279 | A1 * | 8/2007 | Van Luchene ............ 707/1 |
| 2008/0091526 | A1 * | 4/2008 | Shoemaker .............. 705/14 |
| 2008/0109483 | A1 * | 5/2008 | Yoo et al. ............ 707/104.1 |
| 2008/0129725 | A1 * | 6/2008 | Stambaugh ............. 345/419 |
| 2008/0205655 | A1 * | 8/2008 | Wilkins et al. ........... 380/279 |

FOREIGN PATENT DOCUMENTS

| JP | 2002-207923 | 7/2002 |
| JP | 2002-288518 | 10/2002 |
| JP | 2003-108591 | 4/2003 |
| KR | 10-0700622 B1 | 3/2007 |

OTHER PUBLICATIONS

"You Tube's blogger brouhaha: Policy Clarified After Ruckus Over User Rights", Knight Ridder Tribune Business News, Washington: Jul. 22, 2006, p. 1.*
What is Mash-up? Internet Magazine Make Innovation with Technology! dated on Apr. 1, 2006, p. 30-55 and vol. 135.
Japanese Office Action of JP 2008-039586 dated on Jul. 6, 2010.

* cited by examiner

*Primary Examiner* — Ella Colbert
*Assistant Examiner* — Hai Tran
(74) *Attorney, Agent, or Firm* — H.C. Park & Associates, PLC

(57) ABSTRACT

A map advertisement system and method by using a mash-up map advertisement is provided, which can operate various advertisement cost billing policies. The map advertisement system includes an advertisement management unit for generating an advertisement layer and an identifier of the advertisement layer based on advertisement information including geographic location information received from an advertiser terminal; a base map providing unit for providing a base map layer capable of providing geographical information through on-line; and a mash-up map advertisement unit for generating mash-up map data by mixing the advertisement layer with the base map layer based on the geographic location information, wherein the advertisement layer identifier includes at least one information element related to an advertisement exposure on the advertisement layer.

20 Claims, 9 Drawing Sheets

FIG. 6

| f1 | f2 | f3 | f4 | f5 |
|---|---|---|---|---|
| MAP IMAGE NUMBER | ZOOM LEVEL NUMBER | MAP IMAGE COORDINATES | GPS COORDINATES | LINK INFORMATION |

| f6 | f7 | f8 | f9 | f10 | f11 ||
|---|---|---|---|---|---|---|
| TIME FUNCTION | CLICK LIMIT FUNCTION | EXPOSURE LIMIT FUNCTION | ZOOM LEVEL EXPOSURE LIMIT FUNCTION | PRINT LIMIT FUNCTION | URL EXPOSURE LIMIT FUNCTION ||
| | | | | | FOR EXTERNAL WEB SITE | FOR INTERNAL WEB SITE |

ADVERTISEMENT SYSTEM USING MASH-UP MAP AND METHOD THEREOF

CROSS-REFERENCE TO RELATED APPLICATION

This application claims the benefit of Korean Patent Application No. 10-2007-0019690, filed on Feb. 27, 2007, in the Korean Intellectual Property Office, the disclosure of which is incorporated herein by reference.

FIELD OF THE INVENTION

The present disclosure relates to an advertisement management system using a mash-up map and a method thereof, and more particularly, to a system and method of making an advertisement with various billing methods by using a mash-up map including advertisement information.

Also, the present disclosure relates to a system and method capable of supporting "posting" function of a mash-up map including advertisement information to an internal web site or an external web site and tracking information on advertisement exposures and advertisement accesses even if the "posting" function is carried out.

BACKGROUND OF THE INVENTION

Recently, famous portal sites on the Internet mostly provide map services. Generally, basic map data for such Internet map services have been produced by portal sites or expert map production agents. Actually, such Internet maps have been produced and served by Google, Yahoo, Microsoft Corporation, and so forth, and in Korea, many companies have also produced Internet maps.

At present, the so-called mash-up map information, which is produced by adding additional information onto Internet map data, has been provided. The mash-up map information provides geographic area-related information such as a local advertisement, weather, and a crime ridden area, which are mixed with the map, and also provides useful information in addition to the other local information.

In particular, an advertisement of a company in a specified geographic area is made by exposing the advertisement of the corresponding company on the map, and the issuance of discount coupons, discount event information, and so forth, are additionally provided.

FIG. 1 is a signal flow chart for explaining a conventional map service system.

The conventional map service system includes an advertiser terminal 10, a map service system 20 and a user terminal 30.

An advertiser requests an advertisement to the map service system 20 through the advertiser terminal 30 with geographic location information of a company to be advertised and an exposure time (step S10).

In response to the advertisement request, the map service system 20 prepares an advertisement banner corresponding to the geographic location information (step S20). In response to a request for map data in which the geographic location information is included, a position of the company to be advertised is displayed on the map and the advertisement banner is also displayed beside the map.

For example, if the user terminal 30 requests a map corresponding to a specified geographic area to the map service system 20 (step S30), the map service system 20 provides advertisement information of the geographic area in the form of the advertisement banner together with the map data (step S40).

Meanwhile, when the exposure time set by the advertisement request at step S10 is passed, the advertisement will not be displayed any further. At this time, advertisement costs may be charged before or after the advertisement based on the exposure time (step S50).

FIG. 2 is an example screen showing an advertisement exposure in accordance with the conventional map service system.

As can be seen in FIG. 2, a position of a company to be advertised is displayed on the map of a specified region, and a banner advertisement of the corresponding company is exposed beside the map.

In the banner advertisement, discount coupons and valuation information may be provided in addition to the company information. Also, the company to be advertised may be displayed by filtering search results of the specified geographic area in consideration of information, such as a search keyword, a user interest item, user location information, and so forth.

In accordance with the conventional system, however, an advertisement is charged only based on the exposure time of the advertisement, and thus it is impossible to provide various billing policies of advertisement cost. That is, by using the map data to which only the geographic location information of the company is added, it is impossible to track the advertisement exposure displayed on the map, thereby causing difficulties in employing various billing policies of advertisement cost.

As the billing policies of advertisement cost, a CPC (Cost-Per-Click) method, a CPA (Cost-Per-Action) method, a CPM (Cost-Per-Mile) method, and the like, have been proposed. However, in accordance with the conventional system, such advertisement cost billing policies cannot be applied to the map advertisement service, and thus there is unreasonableness in that the advertiser should pay fixed advertisement charges regardless of whether the advertiser's product or company has been effectively advertised.

Meanwhile, since a map service operator cannot suggest various billing policies of advertisement cost to the advertiser according to an advertisement target, it becomes difficult for the map service operator to activate the map advertisement service.

In addition, in accordance with the conventional map advertisement method as described above, when a user terminal uses a map service, the map service is provided only within the web site of a map service system, and thus viral marketing, which is the advantage of an online service, cannot be used at all.

BRIEF SUMMARY OF THE INVENTION

In view of the foregoing, the present disclosure provides a mash-up map advertisement system and method, capable of adopting various billing policies of advertisement cost.

The present disclosure also provides a map advertisement system and method, capable of providing an advertisement exposure to an internal web site or another service of an external web site and tracking information on exposures and accesses of the advertisement.

In accordance with a first aspect of the present invention, there is provided a map advertisement system including: means for generating an advertisement layer and an identifier of the advertisement layer, the identifier being indicative of at least a portion of advertisement information including geographic location of interest received from an advertiser; means for providing a base map layer, the base map layer being indicative of geographic information; and means for generating mash-up map data by combining at least a portion of the advertisement layer with at least a portion of the base map layer based on the geographic location of interest. The identifier includes a plurality of information elements which include at least one information element related to an advertisement exposure on the advertisement layer. The information elements may have a function related to at least one of the number of advertisement exposures, the number of advertisement clicks, and the number of advertisement prints.

Further, the base map providing unit may include: a base map server for storing and providing base map layer data which is divided into a plurality of partial local information; and an open API (Application Program Interface) server for providing an open API that supports use of the base map layer data.

In accordance with a second aspect of the present invention, there is provided a map advertisement method including: receiving advertisement information from an advertiser, the advertisement information including geographic location of interest; allowing the advertiser to select an advertisement billing method; generating an advertisement layer and an identifier of the advertisement layer, the identifier being indicative of at least a portion of the received advertisement information including the geographic location of interest; generating mash-up map advertisement data by combining at least a portion of the advertisement layer with at least a portion of a base map layer based on the geographic location of interest; and charging an account of the advertiser by using the selected advertisement billing method and the advertisement layer identifier.

At this time, the advertisement billing method may be performed based on at least one of the number of advertisement exposures, the number of advertisement clicks, the number of advertisement prints, and the number of advertisement posts.

In accordance with a third aspect of the present invention, there is provided a computer-readable recording medium in which a data structure for a map advertisement is recorded, including: a base map layer structure including a plurality of partial area information divided to provide geographical information; and an advertisement layer structure, displaced on the base map layer, identified by an advertisement layer identifier including information elements related to the base map layer and information elements related to an advertisement exposure.

BRIEF DESCRIPTION OF THE DRAWINGS

The above and other features and advantages of the present invention will become readily apparent by reference to the following detailed description when considered in conjunction with the accompanying drawings wherein:

FIG. 6 shows information elements of an advertisement layer identifier in accordance with the embodiment of the present invention;

DETAILED DESCRIPTION OF THE INVENTION

Figure 1:
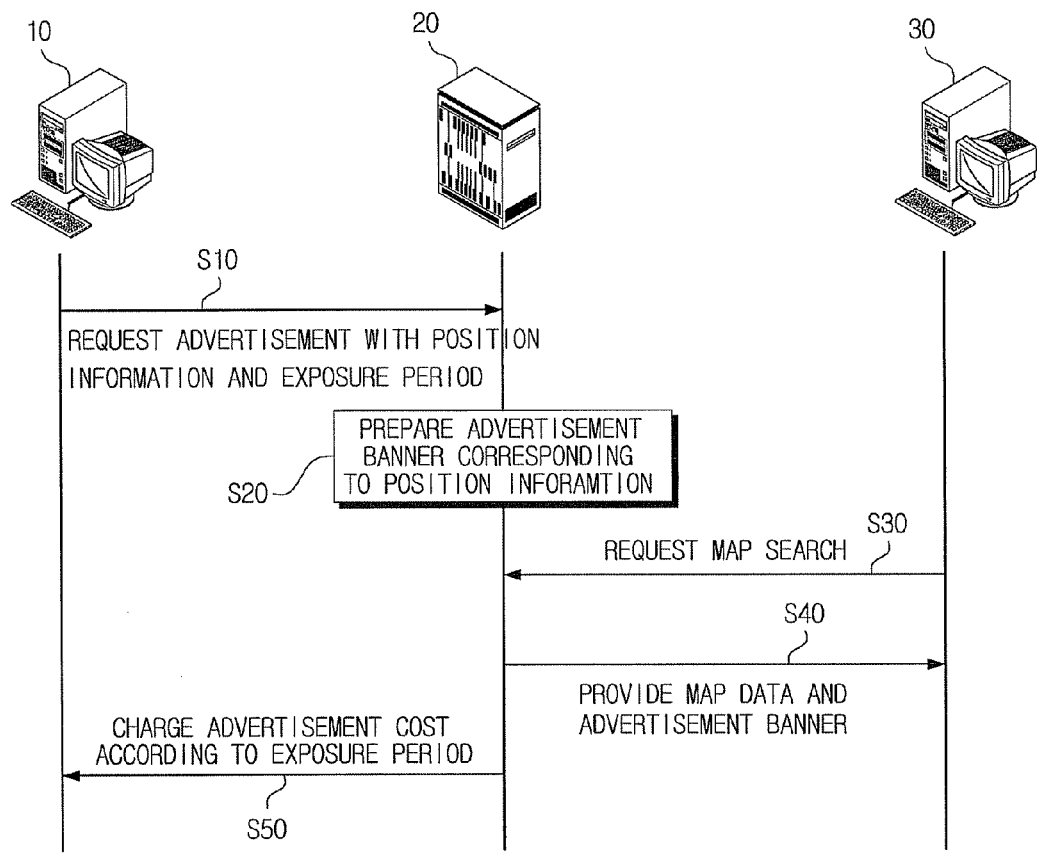
FIG. 1 is a signal flowchart explaining a conventional map service system.
Figure 2:
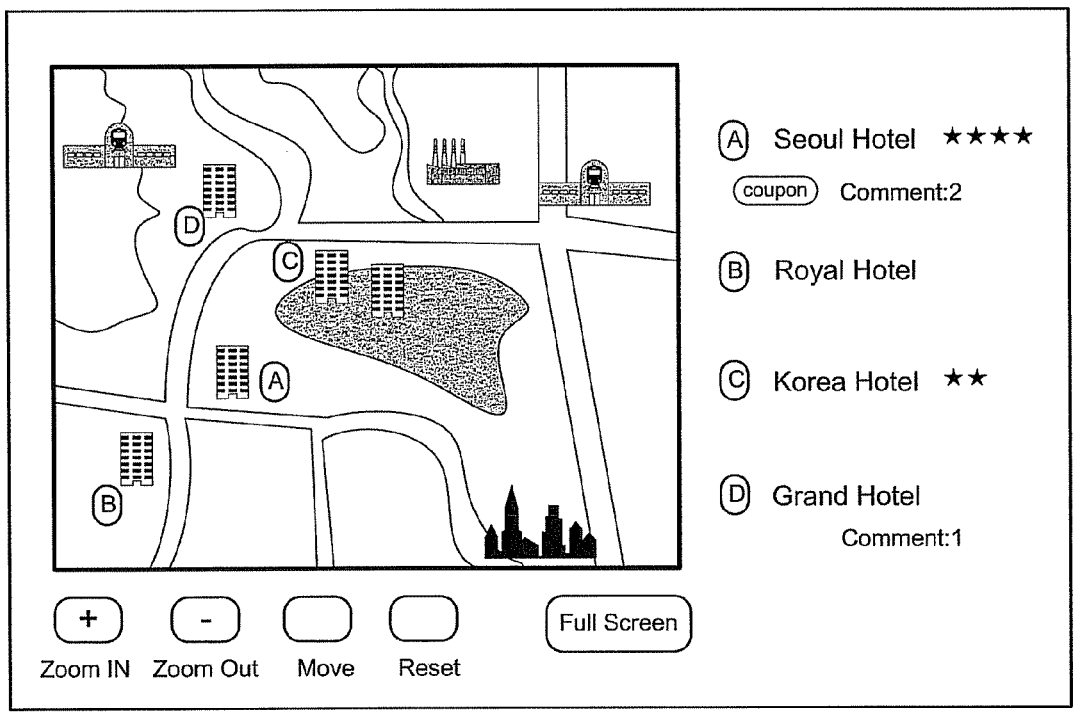
FIG. 2 is an example screen showing an advertisement exposure in accordance with the conventional map service system.

Hereinafter, embodiments of the present invention will be described in detail with reference to the accompanying drawings so that the present invention may be readily implemented by those skilled in the art. However, it is to be noted that the present invention is not limited to the embodiments but can be realized in various other ways. In the drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements.

Figure 3:
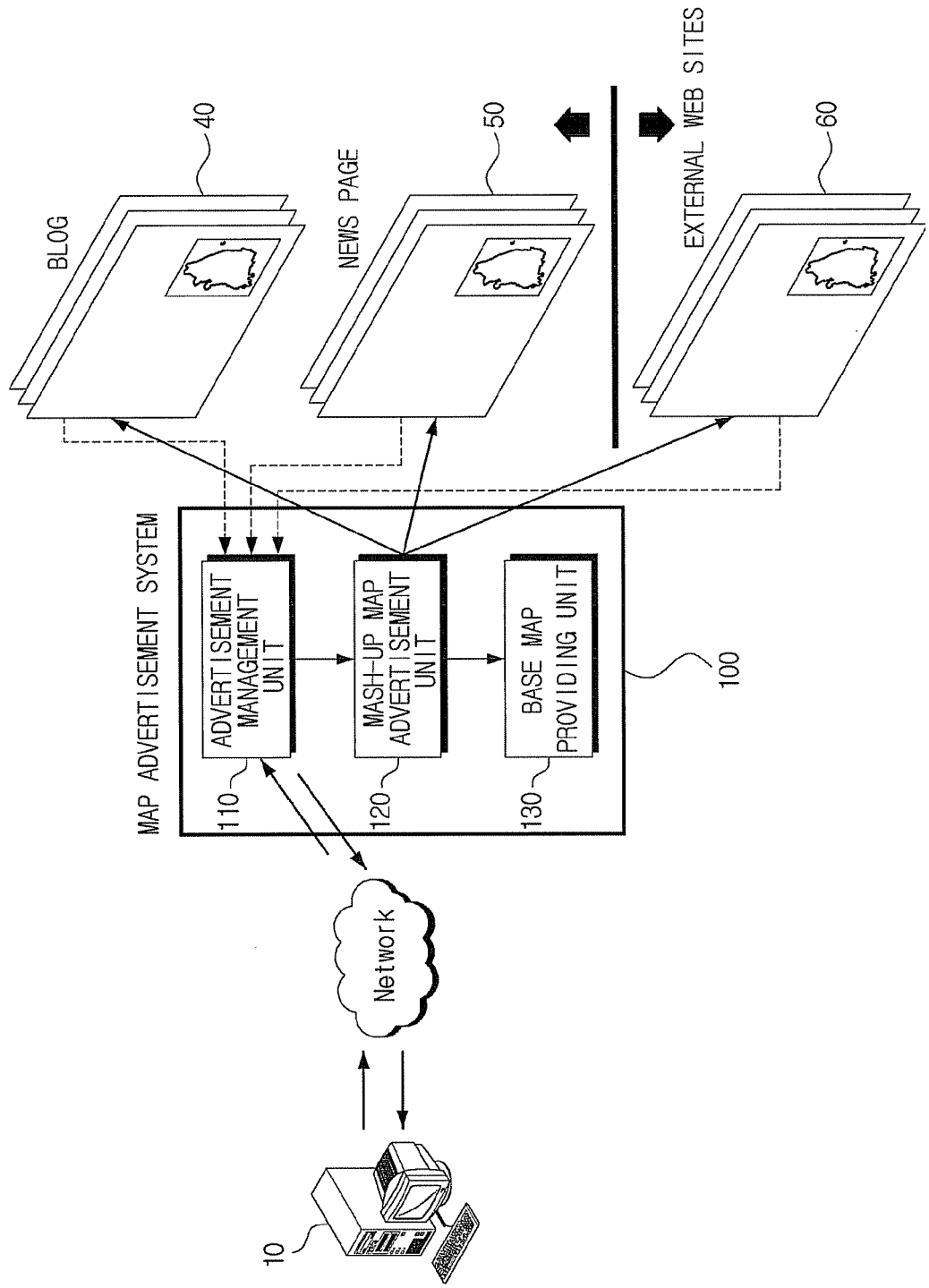
FIG. 3 is a block diagram showing a schematic configuration of a map advertisement system in accordance with an embodiment of the present invention.

FIG. 3 is a block diagram showing a schematic configuration of a map advertisement system in accordance with an embodiment of the present invention.

The map advertisement system 100 in accordance with the embodiment of the present invention includes an advertisement management unit 110, a mash-up map advertisement unit 120, and a base map providing unit 130.

An advertiser terminal 10 requests an advertisement corresponding to specified location information to the map advertisement system 100 through a network. The advertisement management unit 110 receives and registers the request. The advertisement request includes a name of a company, information on an advertisement message, and geographic location information of the company to be advertised. In addition, in case of requesting the advertisement, an advertiser can select one of billing policies for paying advertisement costs.

As the advertisement cost billing policies, as described above, the advertiser may select one or more advertisement cost billing methods among a CPC (Cost-Per-Click) method, a CPA (Cost-Per-Action) method, and a CPM (Cost-Per-Mile) method.

Further, in accordance with the embodiment of the present invention, if "posting" of mash-up map data is performed to an internal web site such as a blog 40 or a news page 50, or to an external web site 60, it is also possible to select a billing method charging the advertisement cost based on the number of advertisement posts.

The advertisement management unit 110 generates advertisement layers by using information included in the advertisement request, and assigns identifiers to the advertisement layers. The identifiers of the advertisement layers may be generated by using an extensible mark-up language (xml). The xml is the standard of an information format capable of creating information in a web or intranet environment and simultaneously sharing data itself and a format type of the data.

The identifier of the advertisement layer includes basic information related to a base map, and information elements related to an advertisement exposure or an advertisement billing method so that the advertisement management unit 110 can track the number of the advertisement exposures, the number of advertisement clicks, and the number of advertisement posts.

The base map providing unit 130 provides a base map layer for providing geographical information. Data of the base map layer is divided to a plurality of partition maps, each having a specified size, and the plurality of partition maps are stored. The partition map is divided again to be properly displayed into a number of partial area information, each having a smaller size than that of the partition map, and an identifier is assigned to each partial area information. Accordingly, if a POI (Point Of Interest) is designated, the partial area information around the POI may be gathered to generate a map data.

In accordance with the embodiment of the present invention, the base map providing unit 130 can provide an open API (Application Program Interface) that enables the internal or external web site to freely use the base map layer data.

The mash-up map advertisement unit 120 generates a mash-up map by mixing the advertisement layer generated by the advertisement management unit 110 with the base map layer data generated by the base map providing unit 130. The mash-up map data including advertisement information may be provided to the internal web site of the advertisement system such as the blog 40 or the news page 50, or to the external web site 60 of the map advertisement system.

As described above, the advertisement management unit 110 generates statistical data on the advertisement exposed in the blog 40, the news page 50, and the external web site 60 by using the advertisement layer identifiers, and provides the generated statistical data to the advertiser terminal 10 for the confirmation of the advertiser.

Figure 4:
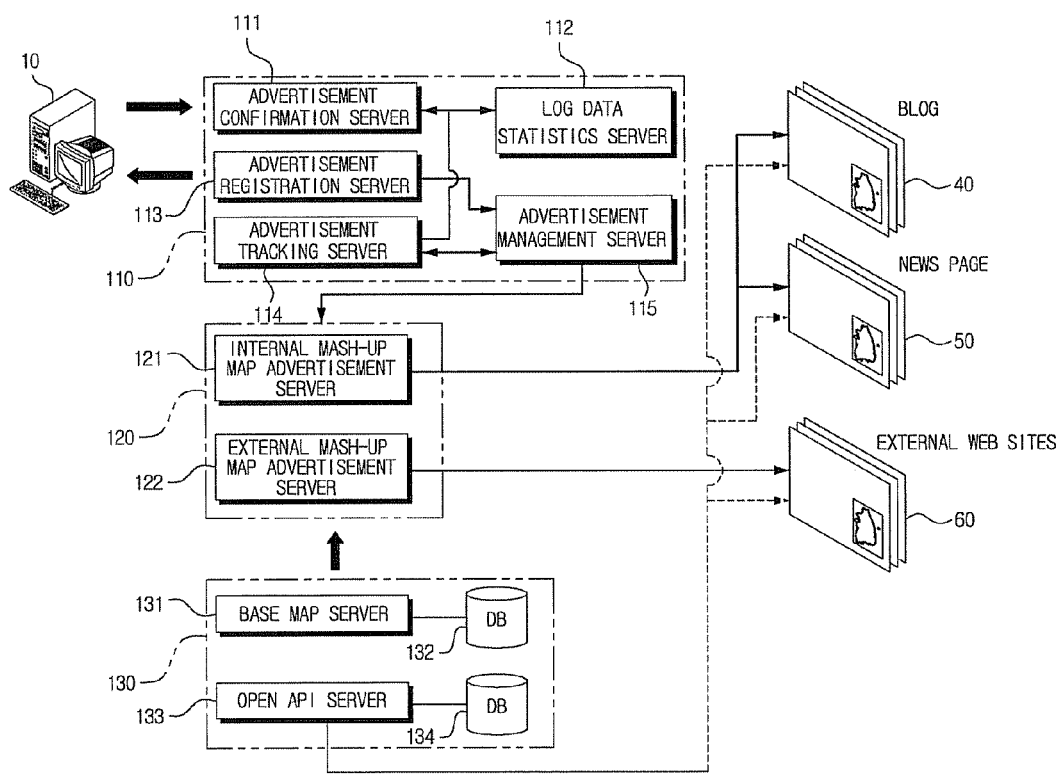
FIG. 4 is a block diagram illustrating a detailed configuration of a map advertisement system in accordance with the embodiment of the present invention.

FIG. 4 is a block diagram illustrating a detailed configuration of a map advertisement system 100 in accordance with the embodiment of the present invention.

The advertisement management unit 110 includes an advertisement confirmation server 111, a log data statistics server 112, an advertisement registration server 113, an advertisement tracking server 114, and an advertisement management server 115.

The advertisement registration server 113 receives the advertisement request from the advertiser terminal 10 and stores the advertisement request. The advertisement information contained in the advertisement request includes basic information such as an advertiser, geographic location information, and advertisement content data, and an advertisement billing method.

The advertisement management server 115 generates the advertisement layer based on the advertisement request stored by the advertisement registration server 113, and assigns an advertisement layer identifier to the generated advertisement layer. As described above, the advertisement layer identifier may be generated in the form of the xml and be compatibly provided to various web sites. Further, the advertisement management server 115 provides a program or a management tool, capable of managing and controlling constituent elements 111, 112, 113, and 114 of the advertisement management unit 110.

The log data statistics server 112 stores log data related to the advertisement and other information. The other information may include ages of advertisement clickers, area information and the like. The other information may be provided to the advertiser, or may be used only as internal statistics data of the advertisement management system 100.

The advertisement tracking server 114 monitors the number of the advertisement exposures, the number of advertisement clicks, the number of advertisement posts, and the like, by using the advertisement layer identifiers. In addition, the advertisement tracking server 114 can monitor addresses of web sites on which the advertisement is exposed or paths through which the advertisement is exposed.

The advertisement confirmation server 111 receives advertisement exposure information stored by the log data statistics server 112 or the advertisement tracking server 114, and performs an authentication process to offer the advertisement exposure information to the advertiser terminal 10.

The base map providing unit 130 includes a base map server 131 and an open API server 133. The base map server 131 and the open API server 133 may include databases 132 and 134 for storing base map information and open API information, respectively.

The base map server 131 provides base map layer data displaying geographical information in response to a map search request. The base map database 132, as described above, stores the partial area information divided from the partitions, and combines the partial area information around the POI (Point Of Interest) to transmit the combined partial area information.

Here, the base map layer data is provided by the base map server 131 together with the open API, and thus any user can use the base map layer data by using the open API. The open API server 133 supports the free use of the base map layer data by providing the API in response to an external request. Here, the API, i.e., the application program interface, means a set of specific functions predetermined by a computer operating system or an application program so that another application program can execute various functions of the computer operating system or the application program.

Since the base map layer data in accordance with the embodiment of the present invention is provided together with the open API, the internal web sites, such as blogs 40 and news pages 50 as well as the external web site 60 can freely use the base map layer data.

The mash-up map advertisement unit 120 includes an internal mash-up map advertisement server 121 and an external mash-up map advertisement server 122.

The internal mash-up map advertisement server 121 generates mash-up map advertisement data that can be displayed on the internal web pages of the map advertisement system such as blogs 40 or news pages 50. At this time, the internal web pages display the mash-up map advertisement data by using the open API already known.

The external mash-up map advertisement server 122 generates mash-up map advertisement data that can be displayed on the external web site 60, and provides the mash-up map advertisement data on which the advertisement layer is displaced to the external web site 60.

The mash-up map advertisement data provided to the external web site 60 can be requested by using the open API, and the mash-up map advertisement data matched with a key value of the open API are provided. In this case, the key value of the open API may be included in the advertisement layer identifier.

The constituent elements included in the advertisement management unit 110, the mash-up map advertisement unit 120, and the base map providing unit 130, as illustrated in FIG. 4, may be configured as separate servers or may be installed in hardware as software modules to perform the same operation.

When the mash-up map data is requested, the mash-up map advertisement unit 120 may transmit the base map and the corresponding advertisement layer in sequence rather than transmit the mixed mash-up map data after storing the mixed data.

Figure 5:
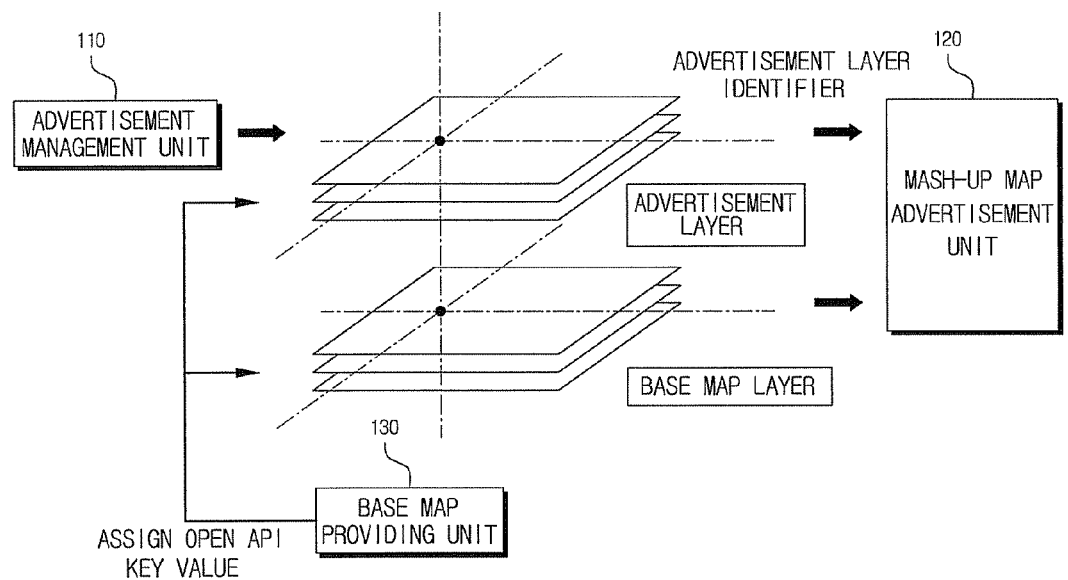
FIG. 5 is a diagram hierarchically depicting a structure of mash-up map advertisement data in accordance with the embodiment of the present invention.

FIG. 5 is a diagram hierarchically depicting a structure of mash-up map advertisement data in accordance with the embodiment of the present invention.

As described above, the mash-up map advertisement data is divided into the advertisement layer and the base map layer. The advertisement layer and the base map layer overlap each other so that their coordinates coincide with each other based on the specified location information.

In the advertisement layer, information, which can be put on the base map to display the advertisement of a specified company, is inserted. The advertisement display information may be image information of various types such as an icon, link information, a company logo, and the like.

The advertisement management unit 110 assigns and manages the identifiers of the advertisement layers. The advertisement management unit 110 stores the mash-up map advertisement data assigned with the identifiers of the advertisement layers in the mash-up map advertisement unit 120, so that another internal web site or external web site is allowed to post the mash-up map advertisement data to another site. By using the advertisement layer identifier, the statistics data according to the advertisement cost billing policy can be tracked. In addition, the advertisement management unit 110 can update the advertisement layer and the advertisement layer identifiers when a new advertisement is requested.

The base map layer and the advertisement layer are generated based on the open API disclosed to an outside. Particularly, in order to support the "posting" function, an open API key value may be assigned to the external web site requesting the function. The open API key value may be included in the advertisement layer identifier.

FIG. 6 shows information elements of an advertisement layer identifier in accordance with the embodiment of the present invention.

The above-described advertisement layer identifier includes information elements related to the map layer and the advertisement layer. The information elements of the advertisement layer identifier is classified into information elements related to the base map and information elements related to the advertisement exposure (or advertisement billing method).

The information elements of the advertisement layer identifier may include a map image number f1, a zoom level number f2, map image coordinates f3, GPS coordinates f4, link information f5, a time function f6, a click limit function f7, an exposure limit function f8, a zoom level exposure limit function f9, a print limit function f10, and a URL exposure limit function f11.

Among the information elements related to the base map, the map image number f1 indicates the map image number of the map layer, and the zoom level number f2 indicates the exposed zoom level. The map image coordinates f3 indicate X and Y coordinates in the map displayed on the map layer. The GPS coordinates f4 indicate GPS (Global Positioning System) coordinates for enabling other devices to use the mash-up map advertisement, and include at least one of Bessel coordinates and WGS84 coordinates. The link information f5 includes information on the corresponding home page or various link information such as an event home page and the like.

Among the information elements related to the advertisement exposure, the time function f6 sets an advertisement exposure period. Unless an update of the advertisement is requested, the corresponding advertisement disappears from the advertisement layer after the lapse of the period according to the time function. The click limit function f7 limits the number of clicks on the advertisement displayed on the advertisement layer or a related advertisement banner.

The exposure limit function f8 means a function for limiting the number of exposures of the mash-up map advertisement. The zoom level exposure limit function f9 is a function that prevents the advertisement from being exposed on the advertisement layer at a specified zoom level.

The print limit function f10 is a function for limiting the number of printings of the mash-up map advertisement. Preferably, in order to count the number of printings, the mash-up map advertisement page may have an embedded print function.

The URL exposure limit function f11 is a function for limiting the number of requests of the mash-up map advertisement data from URLs except for the URL of the map or an area search page of the map advertisement system itself, or the number of the URLs. The URL exposure limit function f11 can be applied to all the internal web sites and external web sites. In case of the external web sites, as described above, the open API key value is required, and thus the open API key value is stored corresponding to the URL.

In accordance with the above-described configuration, the number of advertisement clicks on the advertisement layer, the number of advertisement exposures, or the number of advertisement posts may be set or tracked by using the mash-up map advertisement data, so that the result of the tracking may be reflected in the advertisement costs.

The advertisement layer identifier may be generated in an xml type having a good compatibility so that another web site can use the advertisement layer identifier.

In addition, the above-described functions remove the corresponding advertisement if the clicking or exposure has been made for a predetermined number of times. However, it can be easily understood by those skilled in the art that the embodiment of the present invention is not limited to the above-described functions, but any function can be selected by using the number of advertisement exposures, the number of advertisement clicks, the number of advertisement prints, the number of advertisement posts, and zoom level as variables.

Figure 7:
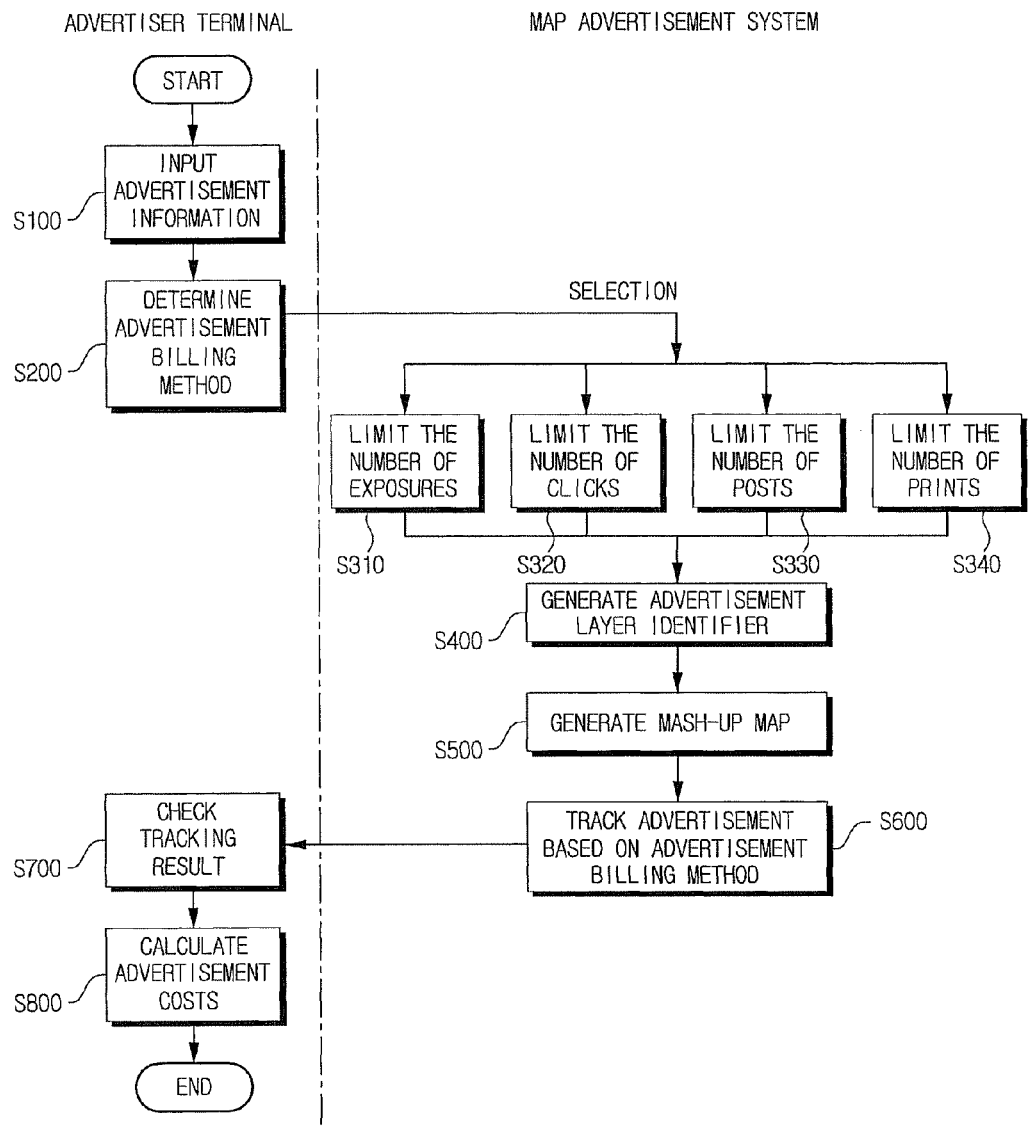
FIG. 7 is a flowchart for explaining a map advertisement method in accordance with an embodiment of the present invention.

FIG. 7 is a flowchart for explaining a map advertisement method in accordance with an embodiment of the present invention.

At step S100, an advertiser inputs advertisement information to a web page provided by a map advertisement system. The advertisement information includes an advertiser, an advertised product, a company to be advertised, and geographic location information of the company to be advertised. The geographic location information of the company includes absolute geographic location information such as GPS coordinates and information on an address or a street number. The geographic location information may be inputted through a direct clicking on the displayed map.

On the other hand, at step S200, the map advertisement system provides a page for selecting an advertisement billing method. As the advertisement billing method, at least one of the CPC (Cost-Per-Click) method, the CPA (Cost-Per-Action) method, and the CPM (Cost-Per-Mile) method is selected. The advertisement billing method may have a limitation on the number of advertisement posts or the like, and a new advertisement billing method can be made by combining the CPC, CPA, and CPM method.

Once the advertisement information and the advertisement billing method are determined, the map advertisement system selects the information elements required for the identifier of the advertisement layer at steps S310 to S340.

Specifically, the number of advertisement exposures can be limited (step S310); the number of advertisement clicks can be limited (step S320); the number of advertisement postings can be limited (step S330); or the number of advertisement prints can be limited (step S340).

Although not illustrated in FIG. 7, a time function for the advertisement period may be generated, and an exposure limit function according to the zoom level may be generated.

At step S400, an advertisement layer identifier is generated based on the selection of the information elements. The advertisement layer identifier is information on the advertisement layer displaced on the base map, so that the advertisement layer identifier will be used as basic information for calculating the advertisement costs. The advertisement layer identifier includes information related to the corresponding base map and information elements, related to the advertisement exposure, selected at steps S310 to S340.

Accordingly, at step S500, the mash-up map is generated by mixing the advertisement layer corresponding to the advertisement layer identifier with the base map layer. A connection link for matching the advertisement layer with the base map layer is the geographic location information of the company to be advertised, and by displacing the advertisement layer on the base map layer, the mash-up map including the advertisement is generated.

The generated mash-up map may be exposed on the internal web site or external web site by request from a user. The exposure of the mash-up map itself functions as the mash-up map advertisement. As the map advertisement as described above, an icon, a text, graphics, a logo image, a banner image, and the like of the advertisement layer may be used, and the advertisement is displayed to a user requesting the mash-up map in order to search the map.

At step S600, the advertisement exposed by the mash-up map advertisement is tracked based on the advertisement billing method. According to the billing method, at least one of the number of advertisement exposures, the number of advertisement clicks, the number of advertisement posts, and the number of advertisement prints selected at steps S310 to S340 may be tracked. The tracking step S600 also includes a procedure of checking whether the tracking result reaches the number of times set at steps S310 to S340.

At step S700, the result of tracking is provided to the advertiser, so that the advertisement costs are calculated based on the result of tracking (step S800). The provision of the result of tracking may be a notice that the tracked number such as the number of advertisement exposures has reached the number of times set at steps S310 to S340, and the advertisement cost calculation procedure may be omitted if the advertisement costs for the set numbers have already been paid and no further advertisement is requested.

Hereinafter, a method of generating the mash-up map advertisement will be described in more detail.

Figure 8:
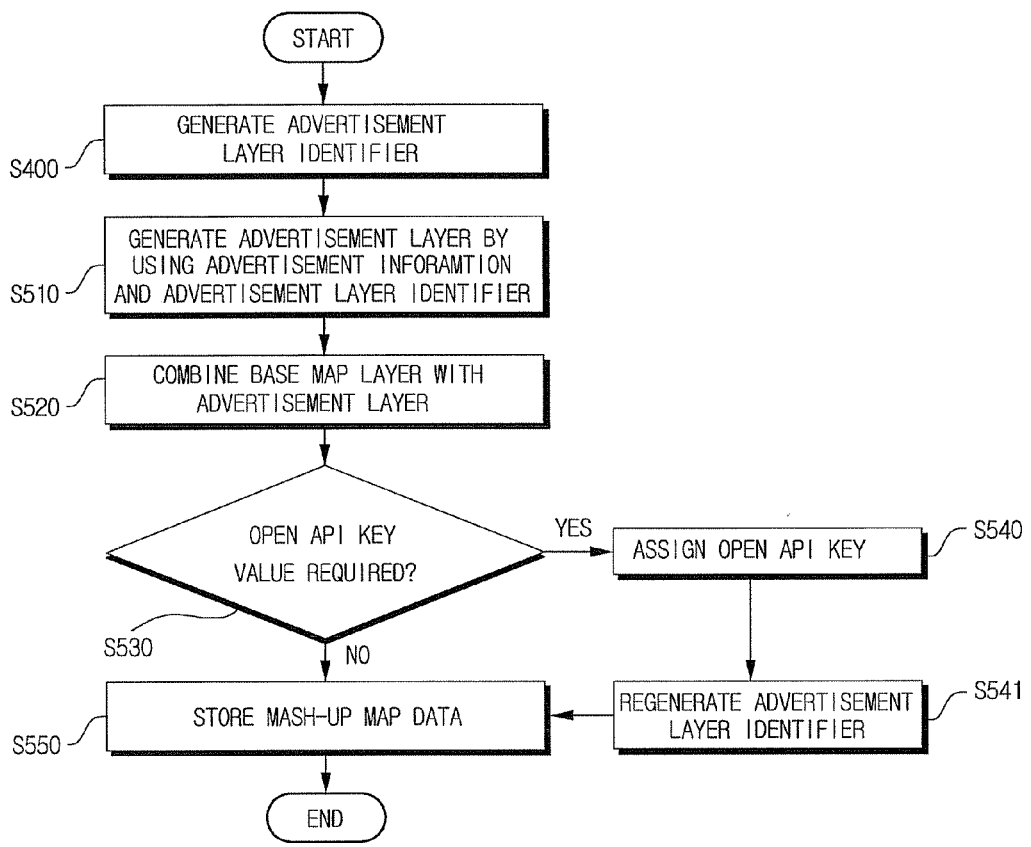
FIG. 8 is a flowchart illustrating a method of generating a mash-up map advertisement in accordance with an embodiment of the present invention.

FIG. 8 is a flowchart illustrating a method of generating the mash-up map advertisement in accordance with an embodiment of the present invention.

If the advertisement layer identifier is generated at step S400, the advertisement layer is generated based on the advertisement layer identifier and the advertisement information inputted by the advertiser terminal (step S510). The advertisement layer is generated so as to be arranged with the base map based on the geographic location information of the company to be advertised. In the advertisement layer, various images such as an icon, a logo, and a name of the company, can be inserted.

At step S520, the mash-up map advertisement is generated by combining the advertisement layer with the base map layer based on the information of the company. The mash-up map advertisement is provided together with the open API, and thus any one who can handle the open API can use the mash-up map advertisement.

At step S530, it is checked whether the open API key value is required. The open API key value is a key value required to use the mash-up map advertisement in the environment of the external web site.

In case that the open API key value is required, the mash-up map advertisement data suitable to the environment of the external web site is transmitted to the external web site by assigning the open key value thereto, so that the mash-up map advertisement can be posted (step S540). In case that the open API key is required, the advertisement layer identifier may be regenerated by adding the related information thereto (step S541). In case of using the open API key value included in the regenerated advertisement layer identifier, the advertisement management unit 110 may count the number of "postings" to the external web site.

At step S550, the mash-up map data mixed with the advertisement layer are stored, and thus the mash-up map data can be used for the map search or area information search.

The stored mash-up map data can be exposed together with the advertisement of the advertisement layer when the map or area information is searched, and it can be tracked by various advertisement cost billing methods how the advertisement of the advertisement layer is exposed to the user.

Figure 9:
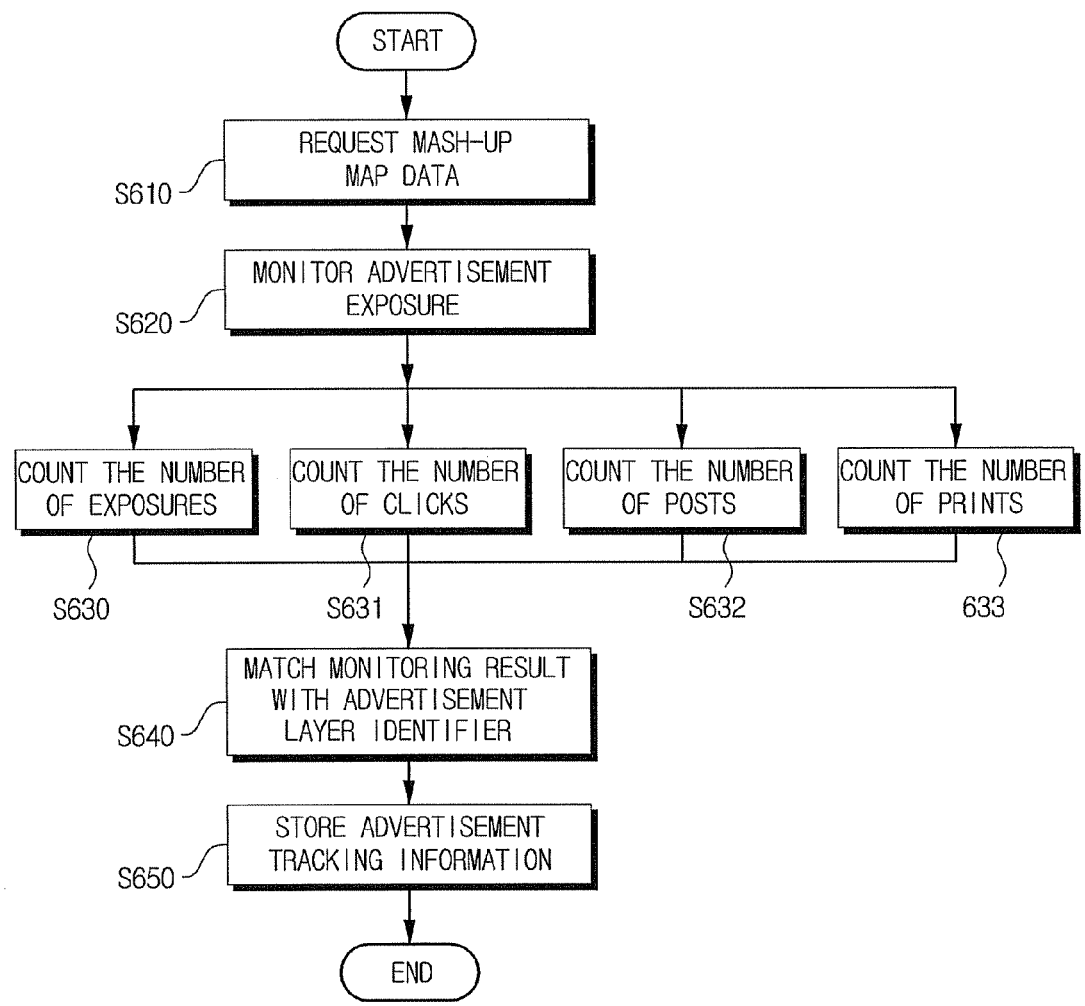
FIG. 9 is a flowchart illustrating an advertisement tracking method in accordance with an embodiment of the present invention.

FIG. 9 is a flowchart illustrating an advertisement tracking method in accordance with an embodiment of the present invention.

When a user searches a map or area information of a specified area, the mash-up map data are requested (step S610). The mash-up map data disclose the area information and advertisement data related to the area to the user.

At step S620, the advertisement tracking server monitors the advertisement exposure. The advertisement exposure is performed in various manners including the display of an icon or a logo according to the advertisement cost billing method.

For example, at step S630, the number of advertisement exposures displayed on the map area is counted when the mash-up map data is requested. The judgment of whether the advertisement is exposed on the map or not may be carried out by using the geographic location information, the map image number, map coordinates, and zoom level information. That is, the number of advertisement exposures may be counted when the mash-up map data corresponding to the zoom level capable of displaying the image or icon of the company are requested.

At step S631, the number of advertisement clicks is counted. If the image or web banner of the mash-up map advertisement has link information, the number of moving to the corresponding link may be counted as the number of advertisement clicks.

Also, the number of "posts" may be counted (step S632). The "posting" function allows the mash-up map data to be displayed on the internal web site such as a blog or a news page, or on the external web site. When the mash-up map data are requested by URLs which do not belong to the advertisement management system, the number of times of "postings" can be calculated by counting the number of requests from the URLs. Also, in case of displaying the mash-up data on the web site by using the open API, the number of "posts" can be counted by using the key value of the open API which is assigned to perform the "posting" function.

At step S633, the number of advertisement prints is counted. It is preferable to generate a separate print button on the web so that the tracking of the advertisement is possible. Accordingly, when the print button is clicked, a print command is transmitted to the operating system of the user, and the map advertisement system is notified that the advertisement is printed.

In the embodiment of the present invention, it can be easily understood from the configuration of the advertisement layer identifier as described above that the number of advertisement exposures, the number of advertisement clicks, and the number of advertisement prints include the number occurring on the web site of the map advertisement system, as well as the number occurring on other web sites which post the advertisements.

Although not illustrated in FIG. 9, it will be easily understood by those skilled in the art that the advertisement exposure time can also be counted and considered to calculate the advertisement costs.

When the tracking of the advertisement is performed, matching of the result of monitoring with the advertisement layer identifier is performed at step S640. At the matching step, it can be judged whether the counted value reaches the specified value determined by the function of the advertisement layer identifier. Further, in case that the counted value exceeds the specified value set by the function of the advertisement layer identifier, the excess can be calculated. It is also possible to set the counted value itself as the output of the function of the advertisement layer identifier.

According to the result at the matching step, advertisement tracking information on the number of advertisements is stored at step S650. The advertisement tracking information may be used to calculate the advertisement costs, and if the advertisement costs have been prepaid, it can be used to determine the removal time of the advertisement. In addition, the advertiser can watch the advertisement tracking information in real time through the advertisement confirmation server 111.

By employing the above-described configuration, the mash-up map advertisement in accordance with the embodiments of the present invention can be performed with various advertisement cost billing methods. In addition, the mash-up map advertisement provides "post" function by using the open API, and even after the "post" is carried out, the advertisement status can be continuously tracked through the use of the selected advertisement cost billing method.

By employing the above-described configuration of the embodiments of the present invention, various advertisement cost billing policies based on the exposure time, the number of advertisement exposures, the number advertisement clicks, the number of advertisement posts, and the number of advertisement prints can be applied to the mash-up map advertisement.

In addition, since an internal web site such as a blog or a news page as well as an external web site supports the "posting" function of the mash-up map advertisement to another web site, the map search and the advertisement can be more activated.

In addition, since the tracking of the basic data on the advertisement cost billing, such as the exposure time, the number of advertisement exposures, the number of advertisement clicks, the number advertisement posts, and the number of advertisement prints, it is possible to operate more efficient advertisement cost billing policy based on the advertisement effect.

While various functional components have been described in the embodiments of the present disclosure, it should be appreciated the embodiments can be implemented in hardware, software, firmware, middleware or a combination thereof and utilized in systems, subsystems, components, or sub-components thereof. When implemented in software, the elements of the embodiments are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a processor, a computer, etc.). As used in this application, the terms "unit" and "system" are intended to refer to a computer-related entity, either hardware, a combination of hardware and software, software, or software in execution. For example, a unit can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a unit. One or more units can reside within a process and/or thread of execution, and a unit can be localized on one computer and/or distributed between two or more computers.

The above description of the present invention is provided for the purpose of illustration, and it would be understood by those skilled in the art that various changes and modifications may be made without changing technical conception and essential features of the present invention. Thus, it is clear that the above-described embodiments are illustrative in all aspects and do not limit the present invention.

The scope of the present invention is defined by the following claims rather than by the detailed description of the embodiment. It shall be understood that all modifications and embodiments conceived from the meaning and scope of the claims and their equivalents are included in the scope of the present invention.

The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A map advertisement system comprising:
a data storage medium;
an advertisement management unit to generate an advertisement layer and an identifier of the advertisement layer, the identifier being indicative of at least a portion of advertisement information comprising geographic location of interest received from an advertiser and stored in the data storage medium;
a base map providing layer to provide a base map layer, the base map layer being indicative of geographic information; and
a mash-up map advertisement unit to generate mash-up map data by combining at least a portion of the advertisement layer with at least a portion of the base map layer based on the geographic location of interest,
wherein the identifier comprises a plurality of information elements, the plurality of information elements comprises at least one information element associated with the base map and at least one function establishing an advertisement exposure on the advertisement layer based on an advertisement billing method.

2. The map advertisement system of claim 1, wherein the function comprised in the at least one information element comprises at least one function associated with at least one of a number of advertisement exposures, a number of advertisement clicks, and a number of advertisement prints.

3. The map advertisement system of claim 2, wherein the advertisement management unit monitors at least one of the number of advertisement exposures, the number of advertisement clicks, and the number of advertisement prints based on the identifier of the advertisement layer.

4. The map advertisement system of claim 3, wherein the advertisement management unit further comprises:
an advertisement registration server to provide an input means of the advertisement information and to register the advertisement information;
an advertisement tracking server to monitor an advertisement status based on the identifier of the advertisement layer; and
an advertisement management server to generate the advertisement layer and the identifier of the advertisement layer and to manage the advertisement registration server and the advertisement tracking server.

5. The map advertisement system of claim 4, wherein the advertisement management unit further comprises:
an advertisement confirmation unit to provide confirmation of the advertisement monitoring status to the advertiser terminal.

6. The map advertisement system of claim 1, wherein the base map providing layer comprises:
a base map server to store and to provide base map layer data which is divided into a plurality of partial area information; and
an open API (Application Program Interface) server to provide an open API that supports use of the base map layer data.

7. The map advertisement system of claim 6, wherein the mash-up map data is generated based on the open API.

8. The map advertisement system of claim 7, wherein the open API server provides the open API to post the mash-up map data on other web sites and a key of the open API.

9. The map advertisement system of claim 8, wherein the identifier of the advertisement layer comprises the key of the open API.

10. The map advertisement system of claim 1, wherein the mash-up map advertisement unit supports "posting" function of the mash-up map data to an internal or external web site; and the identifier of the advertisement layer comprises an information element associated with the advertisement exposure in the mash-up map data which is posted to the internal or external web site.

11. A map advertisement method that utilizes a processor comprising:
receiving advertisement information from an advertiser, the advertisement information comprising geographic location of interest;
allowing the advertiser to select an advertisement billing method;
generating an advertisement layer and an identifier of the advertisement layer, the identifier being indicative of at least a portion of the received advertisement information comprising the geographic location of interest;
generating, using the processor, mash-up map advertisement data by combining at least a portion of the advertisement layer with at least a portion of a base map layer based on the geographic location of interest; and
charging an account of the advertiser by using the selected advertisement billing method and the identifier of the advertisement layer.

12. The map advertisement method of claim 11, wherein the account of the advertiser is charged based on at least one of a number of advertisement exposures, a number of advertisement clicks, a number of advertisement prints, and a number of advertisement posts.

13. The map advertisement method of claim 12, wherein the identifier of the advertisement layer comprises a plurality of information elements, the plurality of information element comprises at least one information element related to a base map and at least one information element related to the advertisement billing method.

14. The map advertisement method of claim 12, wherein the step of performing the advertisement billing comprises:
monitoring an advertisement exposure when the mash-up map data are requested;
wherein the monitoring is carried out with respect to at least one of the number of advertisement exposures, the number of advertisement clicks, the number of advertisement posts, and the number of advertisement prints.

15. The map advertisement method of claim 14, wherein the step of performing the advertisement billing further comprises:
calculating advertisement costs by matching the result of monitoring with the identifier of the advertisement layer.

16. The map advertisement method of claim 11, wherein the mash-up map data is generated by using an open API (Application Program Interface) for supporting "posting" function performed by other web sites.

17. The map advertisement method of claim 16, further comprising:
assigning an open API key to the mash-up map data comprising the open API, wherein the identifier of the advertisement layer further comprises an information element related to the open API.

18. A non-transitory computer-readable recording medium wherein a data structure for a map advertisement is recorded, the computer-readable recording medium comprising:
a base map layer structure comprising a plurality of partial area information divided to provide geographical information; and
an advertisement layer structure, displaced on the base map layer, identified by an advertisement layer identifier comprising information elements related to the base map layer and information elements related to an advertisement exposure,
wherein the information elements related to the advertisement exposure comprise at least one function establishing the advertisement exposure on the advertisement layer based on an advertisement billing method.

19. The non-transitory computer-readable recording medium of claim 18, wherein the at least one function comprised in the information elements related to the advertisement exposure comprises at least one of a number of advertisement exposures, a number of advertisement clicks, a number of advertisement prints, and a number of advertisement posts.

20. The non-transitory computer-readable recording medium of claim 18, wherein the base map layer structure and the advertisement layer structure are configured to be used with an API (Application Program Interface) disclosed to an outside.

\* \* \* \* \*